United States Patent [19]
Caporiccio et al.

[11] Patent Number: 5,395,886
[45] Date of Patent: Mar. 7, 1995

[54] MODIFIED FLUOROHYDROCARBON POLYMERS

[75] Inventors: Gerardo Caporiccio; Gerald A. Gornowicz, both of Midland, Mich.

[73] Assignee: Dow Corning Corporation, Midland, Mich.

[21] Appl. No.: 274,524

[22] Filed: Jul. 13, 1994

Related U.S. Application Data

[60] Division of Ser. No. 50,754, Apr. 12, 1993, which is a continuation of Ser. No. 677,926, Apr. 1, 1991, abandoned.

[51] Int. Cl.$^6$ .............................................. C08F 8/32
[52] U.S. Cl. ................................. 525/102; 525/326.3; 525/383
[58] Field of Search ............................ 525/102, 326.3

[56] References Cited

U.S. PATENT DOCUMENTS

| | | | |
|---|---|---|---|
| 3,607,827 | 9/1971 | Ambler et al. | 525/276 |
| 3,842,267 | 11/1974 | Taketa et al. | 525/102 |
| 3,929,721 | 12/1975 | Leverett | 525/102 |
| 4,314,043 | 2/1982 | Kojima et al. | |
| 4,894,410 | 1/1990 | Kelly et al. | 525/326.2 |
| 4,957,975 | 9/1990 | Carlson et al. | 525/326.2 |
| 5,045,599 | 9/1991 | Murase | 525/102 |

FOREIGN PATENT DOCUMENTS

| | | |
|---|---|---|
| 0178618 | 4/1986 | European Pat. Off. |
| 0332321 | 9/1989 | European Pat. Off. |
| 2096180 | 2/1972 | France |
| 2320317 | 3/1977 | France |
| 2566415 | 12/1985 | France |
| 2600070 | 12/1987 | France |
| 1152208 | 11/1965 | United Kingdom |

OTHER PUBLICATIONS

Cirillo et al., Biological & Synthetic Polymer Networks, 1988, 255.

Brennan et al., Poly. Prepr. (Am. Chem. Soc.) 1988, 29(2), 336.

Dias et al., Polym. Prepr. (Am. Chem. Soc.) 1986, 27(2), 44.

Kise et al., J. Polym. Sci., Polymer Chemistry Ed., vol. 21, 3443–3451 (1983).

*Primary Examiner*—Bernard Lipman
*Attorney, Agent, or Firm*—James E. Bittell

[57] ABSTRACT

This invention relates to fluorohydrocarbon polymers which are modified by the incorporation of substitiuents bearing a functional group such as vinyl, allyl, acrylate, alkoxysilane, amido, sulfonic acid salt, pyridine, carboxylic ester, and carboxylic salt. The functional groups may be further reacted to obtain branching, grafting, or crosslinking of the polymers. Copolymers of vinylidene fluoride and hexafluoropropene such as VITON A rubber and KYNAR FLEX 2801 plastomer, are typical of the class of fluorohydrocarbon polymers which are modified to obtain the new materials of this invention.

4 Claims, No Drawings

MODIFIED FLUOROHYDROCARBON POLYMERS

This is a divisional of copending application(s) Ser. No. 08/050,754, filed on Apr. 12, 1993, which is a continuation (FWC) of Ser. No. 07/677,926, filed on Apr. 1, 1991, now abandoned.

This invention relates to fluorohydrocarbon polymers which are modified by the incorporation of substituents bearing a functional group such as vinyl, allyl, acrylate, alkoxysilane, amido, sulfonic acid salt, pyridine, carboxylic ester, and carboxylic salt. The functional groups may be further reacted to obtain branching, grafting, or crosslinking of the polymers. Copolymers of vinylidene fluoride and hexafluoropropene such as VITON A rubber and KYNAR FLEX 2801 plastomer, are typical of the class of fluorohydrocarbon polymers which are modified to obtain the new materials of this invention.

BACKGROUND OF THE INVENTION

Fluorocarbon and fluorohydrocarbon polymers are known for their properties of chemical and thermal resistance. However, their processing in comparison to non-fluorinated polyalkanes is typically more difficult and complex. For example, polytetrafluoroethylene cannot be processed by standard melt state techniques since at the high temperatures necessary to obtain a reasonable viscosity, it degrades too rapidly. Consequently, it is processed in ways similar to metal processing such as by the sintering of preshaped items formed from powders or of thin layers deposited from water borne dispersions.

Partially fluorinated polymers such as polyvinylidene fluoride are generally processable using melt techniques commonly applicable to thermoplastic hydrocarbon polymers. Higher temperatures and special equipment made of corrosion resistant alloys are required, however. Partially fluorinated rubbers can also be crosslinked by using bifunctional nucleophilic reactants such as telechelic diamines or bis-phenols. Formulations are typically complex including several inorganic bases and accelerators. Also careful control of temperature during both crosslinking and post cure phases of the process is required. Other partially fluorinated copolymers with units containing bromo or iodo substitiuents have been developed which can be vulcanized by peroxides in the presence of triallylisocyanurate.

Elastomers prepared by crosslinking fluorohydrocarbon polymers have superior thermomechanical and chemical resistance relative to hydrocarbon rubbers, but are limited by a service temperature of 150° C. under high compression or tensile load due to creep and relaxation phenomena. Thermal oxidative resistance is very good up to 260° C. to 350° C.

While the chemical and physical modification of hydrocarbon polymers has been quite extensively studied, so that many commercial products are available as blends, alloys, grafted coplymers, block coplymers, radiation crosslinked polymers etc., relatively little effort has been devoted to such methods of modifying fluorocarbon and fluorohydrocarbon polymers.

Accordingly, it is an object of this invention to provide a process for modifying fluorohydrocarbon polymers by the introduction of unique substituents along the polymer chain. It is a further object to provide fluorohydrocarbon polymers having substituents containing reactive groups which will facilitate further controlled reaction and modification of the polymers in processes for blending, alloying, and crosslinking of the polymers.

The crosslinking reaction of vinylidene fluoride (VDF)-hexafluoropropene (HFP) copolymers has been reviewed by Cirillo et al., Biological and Synthetic Polymer Networks, 1988, 255. Specifically, crosslinking is characterized as a sequence of reactions with first a base-induced dehydrofluorination producing polymer chain unsaturation and then network formation by reaction of the unsaturated chains with a bisnucleophile. Cirillo et al. studied the reaction by isolating the unsaturated polymer and reacting it with reagents such as bromine and p-chlorophenate to evaluate the characteristics of the unsaturated sites of the polymer.

A method for grafting organopolysiloxane segments to fluorocarbon polymeric segments is described in U.S. Pat. No. 4,314,043. Generally, both fluorocarbon polymer segments and organopolysiloxane segments are first prepared with reactive sites and then combined under conditions such that the reactive sites co-react to bind the fluorocarbon polymer and organopolysiloxane segments together. However, a graft copolymer was also prepared by refluxing in methylethylketone a vinylidine fluoride-co- hexafluoropropylene polymer with an organopolysiloxane polymer containing ethylene diamine functional substituents.

Brennan et al., Polym. Prepr. (Am. Chem. Soc.) 1988, 29(2), 336, reports surface modification of polyvinylidene fluoride whereby groups such as —OH, —NH$_2$, —CN, Br, or Cl are attached to the polymer chain at the surface interface. In a related investigation Dias et al., Polym. Prepr. (Am. Chem. Soc.) 1986, 27(2), 44, described additional studies directed to the introduction of functional groups on the surface of polymers such as polyvinylidene fluoride and polytetrafluoroethylene.

SUMMARY OF THE INVENTION

This invention describes a scheme for modifying a variety of partially-fluorinated hydrocarbon polymers to provide latent reactive sites on the polymers. The latent reactive sites can be used in subsequent reactions to crosslink or cure the polymers or as sites for grafting other materials to the polymer in order to further modify and improve polymer properties.

In one aspect the present invention is a partially fluorinated hydrocarbon polymer containing a modifying substituent bonded to a carbon atom of the polymer chain by reaction with a nucleophilic group of the modifying substituent. The nucleophilic group is either an amino, an oxy, or a thio group. The modifying substituent further comprises a linking segment and a latent reactive segment, the linking segment links the nucleophilic group to the latent reactive segment and contains multiple carbon atoms with a carbon atom bonded to the nucleophilic group. The latent reactive segment is selected from a group consisting of a vinyl unit, a silane with a hydrolyzable group, an amide unit, a sulfonic acid salt unit, a pyridine unit, and a carboxylic ester or salt unit.

In another aspect the invention relates to compositions of the partially fluorinated hydrocarbon polymer containing the modifying substituent which compositions have been further reacted by several alternative processes to cross link or cure the polymer. For example, when the modifying substituent contains a vinyl group, cross linking and cure may be effected by exposure to UV irradiation or by hydrosilylation reaction with poly(hydromethyl)siloxanes. When the modifying substituent contains a silane with a hydrolyzable group, cross linking and cure may be effected by reaction with water or by reaction with a combination of water and a catalyst such as compounds of tin or titanium.

In another aspect the invention relates to compositions of the partially fluorinated hydrocarbon polymer containing a modifying substituent which compositions have been further reacted by several alternative process to graft additional components to the modifying substituents in order to change and improve the properties of the partially fluorinated hydrocarbon polymer. For example, when the initial modifying substituent contains a silane with one hydrolyzable group, a cohydrolysis with organosilanes having one or two hydrolyzable groups is used to graft such additional organosilane units to the polymer.

DETAILED DESCRIPTION OF THE INVENTION

This invention describes a scheme for modifying a variety of partially-fluorinated hydrocarbon polymers to provide latent reactive substituents along the polymer chain. The modifying substituents may be introduced into the polymer either stepwise in a series of consecutive reactions or in a single step with several reagents acting simultaneously on the polymer. For simplicity the scheme will be describes as a series of consecutive reactions, but the invention should be understood to include the process and modified polymers obtained using either a consecutive or simultaneous reaction approach.

The first stage of polymer modification is dehydrofluorination of the polymer to introduce C—C double bonds in the fluorine-substituted polymer chain. Dehydrofluorination may be effected by reacting the polymer with basic reagents or electropositive metals dissolved or dispersed in solvents or by exposing the polymer to electrophilic or Lewis acid reagents in either gaseous or liquid form. Dehydrofluorination of partially-fluorinated hydrocarbon polymers is reported to occur under a variety of conditions. For example, dehydrofluorination of such polymers upon heating at 150° C. in dimethylformamide is described in Great Britain Patent No. 1,152,208 and the phase transfer catalyzed dehydrofluorination of poly(vinylidene fluoride) in aqueous sodium hydroxide solutions is described by Kise et al. in the Journal of Polymer Science: Polymer Chemistry Edition, Vol. 21, 3443-3451 (1983).

The second stage of polymer modification is the addition of a reagent which adds to the newly-formed C—C double bond to introduce a new substituent group to the polymer chain. A unique feature of the present invention is that specific reagents are used which have not only a functional group, Y, that adds to the double bond, but also have within the same molecule a second functional group, Z, which is latently reactable, but not competitively reactive with the double bond within the fluorohydrocarbon polymer chain. The addition of such a substituent to the polymer does not generate any cross links or cure of the polymer, but instead introduces a site that can be subsequently used in separate and independent cross link or cure chemistry or can be used to branch or graft further modifying compounds to the polymer without effecting a cure.

Reagents which are added to the polymer-chain ethylidene or vinylidene groups to obtain the modified polymers of this invention can be described generally as molecules with an YRZ type of structure where Y is typically a nucleophilic atom of a chemical group that adds readily to the C—C double bonds, R is a linking segment of the molecule, and Z is a latent reactive group such as vinyl, silane with hydrolyzable groups, amide, sulfonic acid salt, pyridine, carboxylic ester or carboxylic salt. The reagents may be selected from compounds having many different combinations of Y, R, and Z segments with the only requirement being that the Z segment remain stable during the reaction of the Y segment with the polymer. It is also important that linking segment, R, sufficiently separate the Y and Z segments to avoid any potential instability that would result from direct interaction in the molecular structure of the reagent. Preferably, the linking segment, R, contains multiple carbon atoms with the Y or nucleophilic atom being attached to a carbon atom.

Fluorohydrocarbon polymers that can be altered to provide the modified polymers of the present invention include, for example, fluoro plastomers such as polyvinylidene fluoride (PVDF), copolymers of vinylidene fluoride (VDF) with chlorotrifluoroethylene (CTFE), copolymers of VDF with hexafluoropropene (HFP), copolymers of VDF with tetrafluoroethylene (TFE), copolymers of CTFE with ethylene, copolymers of TFE with ethylene, polyvinylfluoride (PVF) and fluorocarbon rubbers such as copolymers of VDF with CTFE, copolymers of VDF with HFP, copolymers of VDF with perfluoromethylvinylether, copolymer of TFE and propylene, and terpolymers of VDF, HFP, and TFE.

The fluorohydrocarbon polymers can be altered uniformly by carrying out the modification by mixing solutions of the polymers with reagents. However, the invention also includes modified polymers in shapes such as films, sheets, powders or granules which have portions of the polymer surface modified by contacting the solid polymer with reagents in gaseous form or with reagents dissolved or suspended in solvents which do not swell or dissolve the polymer.

The initial stage of dehydrofluorination of the polymers can be effected by treating the polymer with any of the known reactants for facilitating dehydrofluorination reactions. For example, the polymers may be treated: (1) with organic solvent solutions of hydroxides or carbonates of the elements of Group I and II of the periodic table, subgroup A, such as Na, K, Mg and Ca, with suitable solvents including ethyl ether, tetrahydrofuran (THF), diglyme (DGM, or other polyethers; (2) with organic bases such as the trialkylamines, for example, triethylamine, tri-n-butylamine, pyridine, quinoline, 1,4-diazabicyclo[2.2.2]-octane, 1,8-diazabicyclo-[5.4.0]-undec-7-ene as liquids at low temperature (−78° to −30° C.), as vapors carried by inert gases, or in organic solvents such as polyethers, THF, DGM; (3) with aqueous solutions of hydroxides or carbonates of the elements of Group I and II of the periodic table, subgroup A, such as Na, K, Mg and Ca where the reaction is facilitated by the presence of a phase transfer catalyst, for example the organo-substituted ammonium or phosphonium salts such as tributyloctadecylphosphonium bromide and tetrabutylammonium chloride; (4) with fluorides of elements of the Group I and II of the periodic table, subgroup A, such as Na, K, Mg and Ca or fluorides of quaternary ammonium compounds such as the tetraalkyl ammonium fluorides with such fluorides typically used in the presence of solvents such as ethers, THF, DGM, sulfolane, and acetonitrile; (5) with electropositive metals such as Zn, Mg, Fe, suspended in solvents such as alcohols, glycol, ethers, dioxane, THF, and DGM or with such metals activated by the presence of small amounts of $ZnCl_2$, $MgCl_2$, LiCl, and $SnCl_2$; and (6) with electrophile and Lewis acid reagents, for example, compounds of Al, B, Sn or Ti such as $Al_2O_3$, $AlCl_3$, $AlF_3$, $BF_3$, $SnCl_4$, $TiCl_4$, $Ti(OCH_2CH_3)_4$, compounds of trivalent phosphorous for example trialkylphophines such as triethylphosphine, or compounds of pentavalent Sb and As such as $SbF_5$ and $AsCl_5$ in the presence of organic solvents or suspending agents such as chlorobenzene, nitrobenzene, heptane, ethers such as DGM.

The preferred temperature of treating the polymer to introduce the double bonds depends on the structure of the polymer, the reagent used, the type of solvent if present, and the extent of double bond formation that is desired. Generally, the reaction may be effected at temperatures varying from $-70°$ C. to $150°$ C. The reaction is typically carried out at atmospheric pressure, but may also be conducted in a closed vessel under autogenous pressure or at reduced pressure.

In the second stage of the polymer modification, a substituent is introduced in the polymer chain by addition of a reagent to the double bond formed during the first stage of the reaction. For the purposes of this invention, reagents are selected which contain within their molecular structure (1) a group Y which reacts by addition with or substitution at the double bond sites in the polymer and (2) a group Z which is latently reactive, but does not react during the addition or substitution of the Y group at the double bond site in the polymer. Latently reactive means that the group may be induced to react at a subsequent time by such means, for example, as irradiation, exposure to other chemical agents or elevated temperatures.

The substituents that are introduced in the polymers can be represented generally by the formula

—YRZ where Y represents a nucleophilic atom of an amine, oxy, or thio group; Z represents a latently reactive segment selected from a group consisting of vinyl, allyl, acrylate, silane with a hydrolyzable group, amide, sulfonic acid salt, pyridine, carboxylic ester and carboxylic salt; and R represents a linking segment which links the nucleophilic atom to the latently reactive segment. The linking segment contains multiple carbon atoms with the nucleophilic atom bonded to a carbon atom of the linking segment. The linking segment is typically a hydrocarbon group, but may also contain atoms other than carbon and hydrogen for example oxygen or a halogen.

Substituents where the latently reactive segment is vinyl, allyl, or acrylate may be obtained by reacting polymer with, as nonlimiting examples, allyl alcohol, 2-allylphenol, 4-allyl-2-methoxyphenol, 4-penten-1-ol, 6-hexen-1-ol, allylmercaptan, allylamine, alkylallylamines, 2-hydroxyethylacrylates and 4-vinyl-N-(2-hydroxyethyl)pyridine.

Substituents where the latently reactive segment is amide may be obtained by reacting the polymer with, as nonlimiting examples, p-acetamidophenol, m-hydroxy-N-methylacetanilide, 3-hydroxypropryl acetamide and N-methylacetamidobenzyl alcohol.

Substituents where the latently reactive segment is a carboxylic acid ester or salt may be obtained by reacting the polymer with, as nonlimiting examples, p-hydroxymethylbenzoic acid phenyl ester, hydroxybenzoic acid phenylesters, 3-hydroxy-2-naftoic acid phenyl ester, ethyl 3-mercaptopropionate and p-methylaminobenzoic acid sodium salt.

Substituents where the latently reactive segment is a sulfonic acid salt may be obtained by reacting the polymer with, as nonlimiting examples, p-aminobenzene sulfonic acid sodium salt, p-methylaminobenzene sulfonic acid sodium salt, 1-naphthylamine-4-sulfonic acid sodium salt, 2-naphthylamine-8-sulfonic acid sodium salt, 2-naphthol-6-sulfonic acid sodium salt, 2-naphthol-7-sulfonic acid sodium salt, 1-naphthol-5-sulfonic acid sodium salt, and 2-naphthol-8-sulfonic acid sodium salt.

Substituents where the latently reactive segment is a pyridine may be obtained by reacting the polymer with, as a nonlimiting example, 2-mercaptopyridine.

Substituents where the latently reactive segment is a silane with a hydrolyzable group may be obtained by reacting the polymer with, as nonlimiting examples, 3-aminopropyltrimethoxysilane, 3-aminopropyldimethylmethoxysilane, 3-aminopropylmethyldimethoxysilane, 3-amino-2-methylpropyl-3,3,3-trifluoropropylmethylmethoxy-silane, 3-amino-2-methylproprylmethyldimethoxysilane, N-ethylaminopropylmethyldimethoxysilane, N-methylamino-p-phenylenetrimethoxysilane, 3-mercaptopropyltrimethoxysilane, 3-mercaptopropyldimethyletoxysilane and 1,2,2,4-tetramethylazasilacyclopentane.

The reaction whereby the reagent is added to the fluorohydrocarbon polymer chain can be carried out at the surface of solid polymer shapes. Alternatively substituents may be incorporated more uniformly throughout the polymer by carrying out the reaction on the polymer dissolved, dispersed or swelled in appropriate organic solvents such as tetrahydrofuran, 1,2-dimethoxyethane, dimethylformamide, dimethylacetamide, sulfolane, dimethyl sulfoxide, acetonitrile, chlorobenzene, 1,2-chloroethylene, methylene chloride.

The reaction of the nucleophilic atom of the reagent to the double bond of the fluorohydrocarbon polymer can be accelerated by the presence of tetraalkylammonium or phosphonium salts. The reaction carried out at any effective temperature. Temperatures in the range of $20°$ C. to $150°$ C. are generally effective with temperatures of $20°$ C. to $120°$ C. being preferred. The reaction is typically carried out at atmospheric pressure, but may also be conducted in a closed vessel under autogenous pressure or at reduced pressure.

The modified fluorohydrocarbon polymers containing substituents with latent reactive groups described in the present invention may be further processed to obtain polymeric materials with a broad range of useful properties. The particular properties obtained depends on the specific further processing used and the amount and type of substituents introduced in the polymer. For example the polymers may be further processed by using the latent reactive groups (1) to cure or cross link the polymer, (2) to graft to other polymers, or (3) to chemically modify the polymers by incorporating new functional groups.

For example, when the latent reactive group is vinyl, allyl, or acrylate the fluorohydrocarbon polymer can be cross linked by (a) irradiation with U.V. light either with or without photo sensitizers at temperatures from $20°$ C. to $100°$ C., (b) irradiation with electron beams with gamma-rays or X-rays, (c) initiation by peroxides at temperatures from 50° C. to 150° C., optionally in the presence of reagents such as triallylisocyanurate, (d) hydrosilylation reaction with polyhdyroorganosiloxanes or (e) hydrosilylation reaction with a silane having hydrolyzable groups and subsequently hydrolyzing and condensing to form siloxane cross links.

More specifically, polyhydroorganosiloxanes useful for cross linking the fluorohydrocarbon polymers with vinyl or allyl containing substituents are represented by the formula,

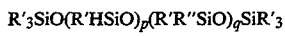

$$R'_3SiO(R'HSiO)_p(R'R''SiO)_qSiR'_3$$

where p and q denote the mole fraction of the respective units in the polymer with p varying from 0.01 to 1 and q varying from 0 to 0.99; R' is methyl; and R'' is an alkyl radical of 1 to 12 carbons, phenyl or a fluoroalkyl radical represented by the formula, $R_fC_nH_{2n}$ where $n=2$ or 3 and $R_f$ is a perfluoroalkyl radical of 1 to 8 carbons. Similarly, useful silanes having hydrolyzable groups are represented by the formula

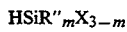

$$HSiR''_mX_{3-m}$$

where $m=0$, 1 or 2; X denotes a halogen preferably represented by the formula chlorine, an alkoxy group such as methoxy and ethoxy, an acyloxy groups such as acetoxy, or hydrocarbonamino such as dimethylamino; and R'' is described above.

As known in the art, hydrosilylation can be catalyzed by platinum supported on carbon, soluble platinum compounds such as $H_2PtCl_6 \cdot H_2O$, palladium or rhodium compounds or the supported metals. Hydrosilylations may also be facilitated by peroxide initiated free radical reactions with peroxides such as t-butylperbenzoate or azobisisobutyronitrile.

The fluorohydrocarbon polymers obtained after hydrosilylation with silanes of formula $HSiR''_mX_{3-m}$ can be subsequently cross linked by well known methods of hydrolysis and condensation. For example, the action of atmospheric moisture at room temperature in the presence of catalysts such as compounds of titanium or tin can be effective to cure or cross link the polymer.

The rate of cure or cross linking possible with the procedures described above can be very fast and is an advantage of the materials of this invention. Such fast cure rates suggest use of the fluorohydrocarbon polymers of this invention for the jacketing of electrical cables or the lining of hoses where improved mechanical, chemical, or solvent resistance is needed. The modified fluorohydrocarbon polymers may also be used as adhesive films or interlayers for glass to provide improved impact and shock characteristics and produce antilacerative and antiexplosive glass for use in automobiles, buildings, solar cells and collectors.

When the latent reactive segment is a silane with a hydrolyzable group, the fluorohydrocarbon polymer can be grafted to organosiloxane polymers by reaction with a polyorganosiloxane represented by the formula

$$R'_3OSi(R'R''SiO)_rSiR'_2X$$

where R', R'', and X are as described above and r denotes the degree of polymerization and may vary from about 4 to a 1000 or more. Similarly, such latent reactive groups can be used to further chemically modify the fluorohydrocarbon polymer by reaction with silanes represented by the formula

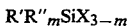

$$R'R''_mSiX_{3-m}$$

where R', R'', X, and m are as described previously. The reaction between the silane hydrolyzable groups of the fluorohydrocarbon polymer and silane or organosiloxane polymer can be carried out using any of the well know methods in the art for effecting such reactions.

Fluorohydrocarbon polymers grafted with organosiloxane polymers can be used as compatibilizer agents for blends of other fluorocarbon polymers and silicone or fluorosilicone polymers. They may also be used to prepare elastomers having improved workability and flexibility at low temperatures such as below −15° C.

When the latent reactive segment is an amide group, the amide can be first hydrolyzed to form the free amine and then the fluorohydrocarbon polymer can be grafted to carboxy terminated aromatic polyamides or polyetherimides represented by the formulas

$$C_6H_5CO[NHC_6H_4NHCOC_6H_4CO]_sC_6H_4COX'$$

and

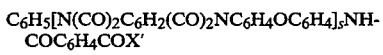

$$C_6H_5[N(CO)_2C_6H_2(CO)_2NC_6H_4OC_6H_4]_sNHCOC_6H_4COX'$$

where X' is chlorine or phenoxy and s denotes the degree of polymerization.

When the latent reactive segment is a carboxylic ester group, the ester can be first hydrolyzed to form the free acid or the phenylester can be directly used as the reactive group and the fluorohydrocarbon polymer can be grafted to amino terminated aromatic polyamides or hydroxy terminated aromatic polyesters represented by the formulas

$$C_6H_5CO[NHC_6H_4NHCOC_6H_4CO]_sNHC_6H_4NH_2$$

and

$$C_6H_5CO[OC_6H_4OCOC_6H_4CO]_sOC_6H_4OH$$

where s denotes the degree of polymerization.

Other examples of functionalized polymers that may be grafted to the modified fluorohydrocarbon polymers of this invention include polyphenylsulfones, polyphenylethers, polyetherimides, polyether ketones.

The grafted copolymers obtained using the modified fluorohydrocarbon polymers of this invention can be used for blending with commercial aromatic engineering polymers to improve their surface properties, their resistance to harsh environments, their resistance to wear and to reduce their water absorption. Modified fluorohydrocarbon polymers of this invention which are further processed by cross linking have improved resistance to solvents and thermal mechanical stress in comparison to the unmodified fluorohydrocarbon polymers.

The following examples are presented to illustrate the invention, but the examples are not intended to limit the scope of the invention as more fully set out in the claims.

EXAMPLE 1

A copolymer of vinylidene fluoride and hexafluoropropene (20 mol % hexafluoropropene) commercially available under the trademark VITON A (30 g) was dissolved in 300 mL of anhydrous tetrahydrofuran (THF) and mixed with a fine dispersion of powdered KOH (0.7 g) and tetrabutylammonium bromide (0.3 g) in 20 mL of THF. The mixture was heated at reflux for 16 h. A yellow polymer, 1A (27.8 g) was recovered by precipitation in methanol/water (50/50 by volume), washing 3 times with methanol/water and drying in a vacuum oven over night. The IR spectra of the yellow polymer 1A showed weak absorptions at 1725 and 1630 cm$^{-1}$ that were not observed for virgin VITON A. The IR absorptions may be attributed respectively to new C-H and double bond features introduced into the copolymer. GPC (polystyrene gel) of the initial VITON A and the yellow polymer 1A showed a drop in $M_w$ from 350,000 (VITON A) to 97,000 (brown elastomer), while the ratio of $M_w/M_n$ changed from 4 (VITON A) to 2.3.

A portion of the yellow polymer 1A (8.4 g) was dissolved in 100 mL of THF and mixed with 4-allyl-2-methoxyphenol (0.8 g), $K_2CO_3$ (0.8 g), tetrabutylammonium bromide (0.15 g). The mixture was heated at reflux for 16 h. The modified copolymer, 1B, was precipitated with 50% aqueous methanol, washed with methanol and dried in a vacuum oven. The IR spectra of 1B showed absorptions characteristic of 4-allyl-2-methoxyphenoxy substituents in the region of 1514, 1630, 2840, and 2880-2915 cm$^1$.

Modified copolymer 1B (1 g) and DAROCURE 2273 type photosensitizer (0.005 g) were dissolved in 10 mL of THF and used to cast a film on a glass surface. After evaporation of the solvent, the dry film was exposed to a UV irradiation dose of about 4000 mJ/cm$^2$. The resulting film exhibited substantial tensile strength, was insoluble in THF, but swelled slightly in butylacetate.

Another portion of modified copolymer 1B (4.4 g) dissolved in 150 mL of THF was combined with ethyldichlorosilane (0.27 g) and hexachloroplatinic acid (0.1 g of a 10% solution in i-propanol) and heated at reflux for 6 h. Silane modified copolymer 1C was recovered by precipitation in toluene/heptane (50/50 by volume). Upon elemental analysis copolymer 1C showed 0.7 wt % silicon corresponding to about 3 wt % of silane-containing branching units.

A portion of copolymer 1C (1 g) dissolved in 20 mL of THF was combined with $Ti(OC_4H_9)_4$ (0.05 g) and used to cast a film. After evaporation of the solvent, the film was heated at 50° C. for 5 h. The film was insoluble in polar organic solvents such as esters and amides and showed high mechanical resistance to elongation.

EXAMPLE 2

Copolymer of vinylidene fluoride and hexafluoropropene (VITON A, 30 g) was dissolved in 300 mL of THF and mixed with methanol (0.32 g), sodium methoxide (0.54 g), tributyloctadecylphosphonium bromide (0.3 g), and 1,2,2,4-tetramethylazasilcyclopentane (1.45 g). The mixture, 2A, was heated at reflux for 6 h. GPC of the mixture showed for the polymer a $M_w$ of 130,000 with a $M_w/M_n$ ratio of 3.1.

A modified copolymer was recovered from a portion of Mixture 2A by precipitation from heptane/methanol (70/30 volume) and washing with methanol. After drying, the copolymer was only partly soluble in THF. IR spectra of the THF soluble portion showed new bands at 2800-2955 and 1500-1530 cm$^{-1}$.

The solution of modified copolymer 2A was very sensitive to moisture and after exposure to moisture, a gelled precipitate formed. Elemental analysis of the precipitate indicated 0.25% Si and 0.15% N corresponding to about 1.5 to 2 wt % of organosilane branches.

A portion of Mixture 2A (30 mL) was combined with dimethyl-3,3,3-trifluoropropylchlorosilane (0.6 g) and added to water (0.08 g) dissolved in THF during a period of 15 min under stirring and then the mixture was stirred for another 15 min. The solution was neutralized with $NaHCO_3$ and copolymer recovered by precipitation in water and washing 3 times in methanol prior to vacuum drying. The resulting elastomeric material 2C was completely soluble in THF. The solubility of this material suggests that the silane substituent previously introduced into the copolymer was successfully capped by reaction with the dimethyl-3,3,3-trifluoropropylchlorosilane. This conclusion is further supported by the $^{19}$F-NMR spectra which showed the characteristic fluorine chemical shift of the trifluoropropyl group at −68 ppm. Elemental analysis of the material showed 0.39% Si and 0.1% N corresponding to 2.1 to 2.2 wt % of siloxane grafted groups.

Another portion of Mixture 2A (30 mL) was combined with titanium diethoxy diacetylacetonate (0.1 mL) and cast into a film on a calendered polytetrafluoroethylene, PTFE, sheet. After standing overnight the film (about 0.1 mm thick) was insoluble in THF and had a tensile strength of 1140 psi.

EXAMPLE 3

A plastomeric copolymer of vinylidene fluoride and hexafluoropropene, commercially available under the trademark KYNAR FLEX 2801, (30 g) was dissolved in 300 mL of anhydrous THF and mixed with sodium methoxide (0.54 g), 3-aminopropyltrimethoxysilane (1.8 g), and tetrabutylammonium bromide (0.15 g). The mixture was heated at reflux for 7 h. Viscosity increased noticeably.

A portion of the mixture (30 mL) was diluted with 5 mL of THF to reduce viscosity and then titanium diethoxy diacetylacetonate (0.05 mL) was added. The catalyzed mixture was cast on a PTFE sheet. After evaporation of the solvent, a film remained about 0.1 mm thick. The film was insoluble in THF and had a tensile strength of 5400 psi, 60% higher than a film obtained in like manner from a solution of unmodified KYNAR FLEX 2801 copolymer. Elemental analysis of modified copolymer film indicated 0.85% Si and 0.41 wt % N, consistent with about 5 wt % of the silane addition to the KYNAR FLEX 2801 copolymer. IR spectra of the modified copolymer film showed new peaks in the region of 2935, 2865 and 1600-1640 cm$^{-1}$.

A second film was cast on glass from the catalyzed mixture. After evaporation of the solvent and standing overnight, the resulting film was strongly adherent to the glass and could not be peeled from the glass surface. When the coated glass was broken by striking with a hammer, the fragments of glass remained attached to the copolymer film and did not spread away. A film obtained in a like manner from a solution of unmodified KYNAR FLEX 2801 copolymer was easily lifted from the glass surface.

EXAMPLE 4

KYNAR FLEX 2801 copolymer (30 g) was dissolved in 300 mL of THF and mixed with anhydrous $K_2CO_3$ (1.5 g) and 3-aminopropyltrimethoxysilane (1.64 g). The mixture was heated at reflux for 16 h. Titanium diethoxy diacetylacetonate (0.05 mL) was added to a portion of the mixture (30 mL). The catalyzed mixture was cast on a calendered PTFE sheet and allowed to cure overnight. The resulting film was transparent and had a tensile strength of 4500 psi, 35% higher than a film obtained in like manner from a solution of unmodified KYNAR FLEX 2801 copolymer. The IR spectra of the film was similar to that obtained for the film described in Example 3. Elemental analysis of modified copolymer recovered by precipitation from heptane indicated a content of 1.1 wt % Si consistent with about 7.5 wt % of the silane addition to the KYNAR FLEX 2801 copolymer.

EXAMPLE 5

KYNAR FLEX 2801 copolymer (30 g) was dissolved in 300 mL of THF and mixed with a dispersion, in 20 mL of N,N-dimethylformamide, of anhydrous $K_2CO_3$ (1.7 g), tetrabutylammonium chloride (0.3 g) and diazabicyclooctane (0.55 g, commercially available under the acronym DABCO). The mixture was heated at reflux for 15 min and then sodium p-aminobenzenesulfonate (1.95 g) was added and reflux was continued for 24 h. The modified copolymer did no precipitate with water, but precipitated after addition of 10% aqueous HCl. The polymer was washed with aqueous methanol and dried.

IR spectra of the recovered copolymer showed a new peak at 830 cm$^{-1}$, attributed to para substituted benzene rings, a significant increased intensity of a sharp peak at 1390 cm$^{-1}$, attributed to CN stretching and the appearance of a weak absorption at 3300 and 1200 cm$^{-1}$ attributed to OH and sulfonic acid groups. Elemental analysis indicates 0.11 wt % N consistent with about 1.5 wt % of aminobenzene sulfonic acid groups in the copolymer.

EXAMPLE 6

KYNAR FLEX 2801 copolymer (30 g) was dissolved in 300 mL of THF and mixed with KOH (0.28 g), 4-allyl-2-methoxyphenol (1.66 g) and tetrabutylammonium bromide (0.3 g). The mixture was heated at reflux for 6 h then the copolymer was recovered by precipitation in methanol, washed in methanol and dried. IR spectra of the recovered copolymer showed new absorptions at 1514 and 2840–2900 cm$^{-1}$ attributed to the bonded eugenol residue.

A portion of the recovered copolymer (4.5 g) was dissolved in 10 mL of dimethylsulfoxide and mixed with methylphenylsilane (0.24 g) and t-butylbenzoylperoxide (0.072 g). The mixture was heated at 80°–90° C. for 16 h under nitrogen. The copolymer was recovered by precipitation in heptane/methanol (80:20) and washed with absolute ethanol.

A portion of this recovered copolymer (0.5 g) was dissolved in 10 mL of THF and combined with diethylamine (2 g), water (5 g), methanol (10 mL), and dibutyltindilaurate (0.05 g). A film was immediately cast from the mixture and after overnight evaporation of the solvent at room temperature, the resulting film was 0.02 mm thick and had a tensile strength of 2000 psi and was resistant to polar solvents. When a portion of the mixture used for the film was refluxed for 6 h, a completely insoluble gel was precipitated.

EXAMPLE 7

Polyvinylidene fluoride (30 g, commercially available under the trademark KYNAR) was dissolved in 300 mL of THF and mixed with a dispersion in 20 mL of THF of sodium methoxide (0.11 g), potassium carbonate (1.4 g), tetrabutylammonium bromide (0.3 g), and 3-amino-propryltrimethoxysilane (1.8 g). The mixture was heated at reflux for 16 h. A portion of the polymer was recovered by precipitation with toluene/hexane (50:50 by volume) and dried. IR spectra showed an increase in the intensity of a peak at 2965 cm$^{-1}$ relative to the peak at 3005 cm$^{-1}$. Elemental analysis indicated 0.14 wt % Si corresponding to about 1 wt % of aminopropylsilane groups in the polymer. When water was added to a portion of the solution of the modified polymer and it was allowed to stand for 26 h, the polymer gelled and was no longer soluble in THF. The gelling is consistent with cross linking resulting from hydrolysis and condensation of the alkoxysilane groups which were incorporated in the polymer as modifying substituents.

We claim:

1. A cross linked polymer formed by the reaction of
   (A) water or water combined with a grafting silane selected from the group consisting of dimethyl-3,3,3-trifluoropropylchlorosilane, methyl-3,3,3-trifluoropropyldichlorosilane, dimethyl-3,3,3-trifluoropropylmethoxysilane, and methyl-3,3,3-trifluoropropyldimethoxysilane with
   (B) a fluorohydrocarbon polymer selected from the group consisting of polyvinylidene fluoride, copolymers of vinylidene fluoride with chlorotrifluoroethylene, copolymers of vinylidene fluoride with hexafluoropropene, copolymers of vinylidene fluoride with tetrafluoroethylene, copolymers of chlorotrifluoroethylene with ethylene, copolymers of tetrafluoroethylene with ethylene, polyvinylfluoride, copolymers of vinylidene fluoride with perfluoromethylvinylether, copolymers of tetrafluoroethylene and propylene, and terpolymers of vinylidene fluoride, hexafluoropropene and tetrafluoroethylene; the fluorohydrocarbon polymer is melt-processable and contains a modifying substituent attached to a carbon atom of the polymer chain by a bond to a nucleophilic atom of the modifying substituent, the nucleophilic atom is a nitrogen atom of an amino group; where the modifying substituent is represented by the general formula,

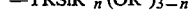

—YRSiR$^3{}_n$(OR$^2$)$_{3-n}$ where Y represents an amino; R represents a linking segment containing 2 to 20 carbon atoms; R$^3$ is an alkyl group of 1 to 8 carbons, vinyl, allyl, 5-hexenyl, trifluoropropyl or phenyl; R$^2$ is an alkyl group of 1 to 4 carbons and n is 0, 1 or 2 and with the proviso that the nucleophilic atom of Y is bonded to a carbon atom of R and Si is not bonded to the same carbon atom of R to which the nucleophilic atom of Y is bonded.

2. The cross linked polymer of claim 1 where the polymer is formed by the reaction of water with the fluorohydrocarbon polymer.

3. The cross linked polymer of claim 2 where the reaction of the water with the fluorohydrocarbon polymer is catalyzed by a tin compound or a titanium compound.

4. The cross linked polymer of claim 1 where the polymer is formed by reaction of the fluorohydrocarbon polymer with water combined with a grafting silane selected from the group consisting of dimethyl-3,3,3-trifluoropropylchlorosilane, methyl-3,3,3-trifluoropropyldichlorosilane, dimethyl-3,3,3-trifluoropropylmethoxysilane, and methyl-3,3,3-trifluoropropyldimethoxysilane.

* * * * *